United States Patent
Packer Ali et al.

(10) Patent No.: US 10,642,781 B2
(45) Date of Patent: May 5, 2020

(54) BOOT TIME DETERMINATION OF CALIBRATION PARAMETERS FOR A COMPONENT COUPLED TO A SYSTEM-ON-CHIP

(71) Applicant: QUALCOMM Incorporated, San Diego, CA (US)

(72) Inventors: Dhamim Packer Ali, San Diego, CA (US); Sreenivasulu Reddy Chalamcharla, San Diego, CA (US); Ruchi Parekh, San Diego, CA (US); Daison Davis Koola, San Diego, CA (US); Dhaval Patel, San Diego, CA (US); Eric Taseski, San Diego, CA (US); Yanru Li, San Diego, CA (US); Alexander Gantman, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 15/682,296

(22) Filed: Aug. 21, 2017

(65) Prior Publication Data
US 2018/0293204 A1    Oct. 11, 2018

Related U.S. Application Data

(60) Provisional application No. 62/483,189, filed on Apr. 7, 2017.

(51) Int. Cl.
*G06F 15/177* (2006.01)
*G06F 9/4401* (2018.01)
(Continued)

(52) U.S. Cl.
CPC ......... *G06F 15/177* (2013.01); *G05B 13/021* (2013.01); *G06F 1/324* (2013.01);
(Continued)

(58) Field of Classification Search
CPC .... G06F 15/177; G06F 1/3275; G06F 1/3293; G06F 9/4401; G06F 9/4403;
(Continued)

(56) References Cited

U.S. PATENT DOCUMENTS 7,925,877 B2   4/2011   Andrianov
9,031,064 B2   5/2015   Ranganathan et al.
(Continued)

OTHER PUBLICATIONS

Chandrasekar K., et al., "Towards Variation-Aware System Level Power Estimation of DRAMs", May 29,2013; May 29-2013-Jun. 7, 2013, May 29, 2013 (May 29, 2013), pp. 1-8, XP058020090.
(Continued)

*Primary Examiner* — Glenn A. Auve
(74) *Attorney, Agent, or Firm* — Qualcomm Incorporated

(57) ABSTRACT

Various additional and alternative aspects are described herein. In some aspects, the present disclosure provides a method of calibrating a component. The method includes receiving previous calibration parameters for an external component at a secondary SoC from a primary SoC, wherein the secondary SoC is coupled to the external component and configured to calibrate the external component. The method further includes determining validity of the previous calibration parameters by the secondary SoC. The method further includes operating the external component by the secondary SoC based on the determined validity of the previous calibration parameters.

30 Claims, 4 Drawing Sheets

(51) Int. Cl.

| | |
|---|---|
| *G06F 1/3293* | (2019.01) |
| *G06F 1/3234* | (2019.01) |
| *G06F 9/445* | (2018.01) |
| *G06F 1/324* | (2019.01) |
| *G06F 30/30* | (2020.01) |
| *G05B 13/02* | (2006.01) |
| *G06F 15/76* | (2006.01) |
| *G06F 21/57* | (2013.01) |

(52) U.S. Cl.
CPC .......... *G06F 1/3275* (2013.01); *G06F 1/3293* (2013.01); *G06F 9/4401* (2013.01); *G06F 9/4403* (2013.01); *G06F 9/4405* (2013.01); *G06F 9/4416* (2013.01); *G06F 9/44505* (2013.01); *G06F 15/76* (2013.01); *G06F 21/575* (2013.01); *G06F 30/30* (2020.01)

(58) Field of Classification Search
CPC .. G06F 9/4405; G06F 9/44505; G06F 21/575; G05B 13/021
See application file for complete search history.

(56) References Cited

U.S. PATENT DOCUMENTS

| | | |
|---|---|---|
| 9,177,152 B2 | 11/2015 | Leclercq |
| 9,230,112 B1 | 1/2016 | Peterson et al. |
| 9,547,497 B2 * | 1/2017 | Swanson ............. G06F 15/7807 |
| 2013/0282951 A1 | 10/2013 | Kuo et al. |

OTHER PUBLICATIONS

Chen Y-J., et al., "Opportunities of Synergistically Adjusting Voltage-Frequency Levels of Cores and DRAMs in CMPs with 3d-Stacked DRAMs for Efficient Thermal Control", ACM SIGAPP Applied Computing Review, ACM, 2 Penn Plaza, Suite 701 New York, 10121-0701 USA, val. 16, No. 1, Apr. 14, 2016, pp. 26-35, XP058081974.

Deng Q., et al., "Active Low-Power Modes for Main Memory with MemScale", IEEE Micro, IEEE Service Center, Los Alamitos, CA, US, val. 32, No. 3, May 1, 2012 (May 1, 2012 ), pp. 60-69, XP011448804, ISSN: 0272-1732.

Holmbacka S., et al., "Performance Monitor Based Power Management for big.LITTLE Platforms", Proceedings of the HIPEAC Workshop on Energy Efficiency with Heterogeneous Computing, Jan. 19-21, 2015, Amsterdam, Netherlands, Jan. 1, 2015 (Jan. 1, 2015), pp. 1-6, XP055505979.

International Search Report and Written Opinion—PCT/US2018/025243—ISA/EPO—Oct. 4, 2018.

Khanna R., et al., "Unified Extensible Firmware Interface: An Innovative Approach to DRAM Power Control", Energy Aware Computing (ICEAC), 2011 International Conference on IEEE, Nov. 30, 2011 (Nov. 30, 2011), pp. 1-6, XP032099549.

Nikola R., et al., "Supercomputing with Commodity CPUs: Are Mobile SaCs Ready for HPC?", 2013 SC—International Conference for High Performance Computing, Networking, Storage and Analysis (SC), ACM, Nov. 17, 2013 (Nov. 17, 2013), pp. 1-12, XP032628652.

* cited by examiner

BOOT TIME DETERMINATION OF CALIBRATION PARAMETERS FOR A COMPONENT COUPLED TO A SYSTEM-ON-CHIP

CROSS-REFERENCE TO RELATED APPLICATIONS

This application claims the benefit of U.S. Provisional Patent No. 62/483,189, filed Apr. 7, 2017. The content of the provisional application is hereby incorporated by reference in its entirety.

TECHNICAL FIELD

The teachings of the present disclosure relate generally to system-on-chip (SoC) integrated circuit design, and in certain aspects, to determination of calibration parameters for a component coupled to a SoC.

INTRODUCTION

Computing devices are ubiquitous. Some computing devices are portable, such as mobile phones, tablets, and laptop computers. As the functionality of such portable computing devices increases, the computing or processing power required and, generally, the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Many of these portable devices include a system-on-chip (SoC) to enable one or more primary and peripheral functions on the specific device.

A SoC generally includes multiple central processing unit (CPU) cores embedded in an integrated circuit or chip and coupled to a local bus. The CPU cores may further be arranged into or more computing clusters. The SoC may further generally include hardware components and other processors.

The SoC, like larger computing devices such as desktop and server computers, relies on a boot sequence or a boot code upon powering up. The boot sequence is the initial set of operations that the SoC performs when power is first applied to the SoC. The boot code enables a (e.g., bootstrapping) process that initializes the SoC. The boot code is typically stored in a read-only memory (ROM) for quick access, low complexity, spatial efficiency, low cost, and security reasons.

The boot sequence may utilize internal memory (e.g., on-chip memory that is on the same chip as the SoC, such as static random-access memory (SRAM)) and complex drivers to securely boot the SoC, as well as external memory (e.g., off-chip memory that is off the same chip as the SoC, including dynamic random access memory (DRAM), such as double data rate (DDR) synchronous DRAM (SDRAM), low power DDR (LPDDR), etc.) so as to save costs on the amount of internal memory used when the SoC has more functionality that requires additional memory to boot. The external memory may be stacked with the SoC (e.g., application processor, modem chip, etc.), may be configured as a package on package design, may be completely external (e.g., not on the same package as the SoC), etc.

As part of the boot sequence, to use external memory or other components coupled to the SoC (e.g., temperature sensors, etc.), the external memory or other components may need to be calibrated (also referred to as "trained"). For example, the external memory may rely on the SoC to determine calibration parameters, such as timing parameters for communicating between a CPU of the SoC and the external memory over buses, network on chip (NoC), etc. The external memory may be configured to operate at one or more frequencies (e.g., input/output (I/O) bus clock frequencies) at one or more voltages. Accordingly, the SoC may need to calibrate the external memory across multiple frequencies and voltages, and determine timing values or other calibration parameter values for the various frequency/voltage combinations. These calibration parameter values for the external memory may further depend on the specific environment of the external memory, including the process, voltage, and temperature (PVT) variation effects on on-chip interconnects. Accordingly, the calibration of the external memory may need to be performed for the particular device that the external memory is included in. The calibration of the external memory may take significant time (e.g., on the order of 3-5 seconds to complete) for certain types of external memory (e.g., LPDDR4 or other types of memory which have high operating frequency and low power). Accordingly, techniques for efficient external component calibration are desirable.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides a method of calibrating a component. The method includes receiving previous calibration parameters for an external component at a secondary SoC from a primary SoC, wherein the secondary SoC is coupled to the external component and configured to calibrate the external component. The method further includes determining validity of the previous calibration parameters by the secondary SoC. The method further includes operating the external component by the secondary SoC based on the determined validity of the previous calibration parameters.

In some aspects, the present disclosure provides a circuit. The circuit includes a primary SoC including a first bus, a first processor coupled to the first bus, a storage controller coupled to the first bus, and a first chip to chip interface coupled to the first bus. The circuit further includes a secondary SoC comprising a second bus, a second processor coupled to the second bus, a component interface coupled to the second bus, wherein the component interface is configured to interface with an external component, and a second chip to chip interface coupled to the second bus, wherein the second chip to chip interface is configured to interface with the first chip to chip interface to provide communication between the primary SoC and the secondary SoC. The second processor is configured to receive previous calibration parameters for the external component from the first processor, wherein the first processor is configured to retrieve the previous calibration parameters from a storage coupled to the storage controller. The second processor is further configured to determine validity of the previous calibration parameters. The second processor is configured to operate the external component based on the determined validity of the previous calibration parameters.

In some aspects, the present disclosure provides a computer readable medium having instructions stored thereon for causing a circuit to perform a method of calibrating a component. The method includes receiving previous calibration parameters for an external component at a secondary SoC from a primary SoC, wherein the secondary SoC is coupled to the external component and configured to calibrate the external component. The method further includes determining validity of the previous calibration parameters by the secondary SoC. The method further includes operating the external component by the secondary SoC based on the determined validity of the previous calibration parameters.

In some aspects, the present disclosure provides a circuit. The circuit includes means for receiving previous calibration parameters for an external component at a secondary SoC from a primary SoC, wherein the secondary SoC is coupled to the external component and configured to calibrate the external component. The circuit further includes means for determining validity of the previous calibration parameters by the secondary SoC. The circuit further includes means for operating the external component by the secondary SoC based on the determined validity of the previous calibration parameters.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Although the teachings of this disclosure are illustrated in terms of integrated circuits (e.g., a SoC), the teachings are applicable in other areas. The teachings disclosed should not be construed to be limited to SoC designs or the illustrated embodiments. The illustrated embodiments are merely vehicles to describe and illustrate examples of the inventive teachings disclosed herein. Further, though certain techniques for determining calibration parameters are described with respect to external memory, similar techniques may be used for determining calibration parameters for other components such as high speed devices/interfaces that need to be calibrated at boot (e.g., by a SoC).

Figure 1:
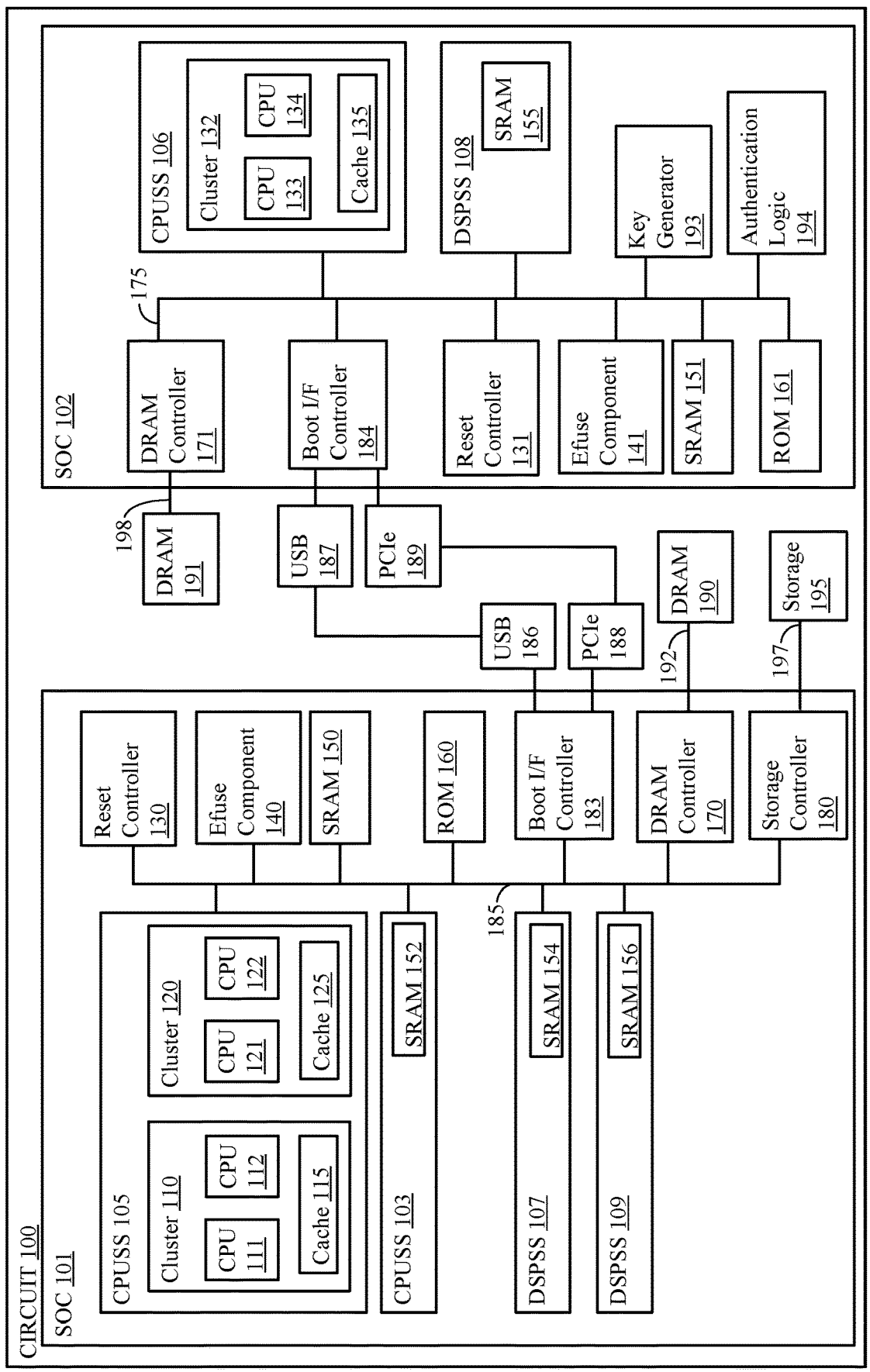
FIG. 1 is a simplified schematic diagram of an exemplary circuit including a plurality of integrated system-on-chip (SoC) circuits, in accordance with certain aspects of the present disclosure.

FIG. 1 is a simplified schematic diagram of an exemplary circuit 100, in accordance with certain aspects of the present disclosure. For example, circuit 100 may correspond to a chip, board, or other circuit layout comprising a plurality of integrated SoCs. For example, as shown, circuit 100 includes a SoC 101 and a SoC 102. In certain aspects, circuit 100 may be referred to as a SoC comprising a plurality of integrated SoCs. Though circuit 100 is shown as including two SoCs, it should be apparent to one of ordinary skill in the art that circuit 100 may include more than two SoCs. In particular, circuit 100 includes a primary SoC 101 and one or more secondary or companion SoCs (e.g., SoC 102). Primary SoC 101 may be an application processor that controls the overall circuit 100, including boot and power-up (e.g., and boot order) of any secondary SoCs such as SoC 102. Each secondary SoC may provide additional functionality such as modem, WiFi, camera, or other dedicated functionality. The SoCs 101, 102, etc. may be interconnected by one or more chip-to-chip interfaces such as peripheral component interconnect express (PCIe) interface, universal serial bus (USB) interface, serial peripheral interface (SPI), etc. In certain aspects, only one of the one or more chip-to-chip interfaces may be used for boot as discussed herein.

As shown, the SoC 101 includes a CPU sub-system (CPUSS) 105. The CPUSS 105 includes a plurality of CPU cores 111, 112, 121, and 122. Though CPUSS 105 is shown with a particular number of CPU cores, it should be noted that there may be additional or fewer cores in CPUSS 105. Further, CPU cores 111 and 112 are part of a cluster 110, and CPU cores 121 and 122 are part of a cluster 120. Again, though shown with a particular number of CPU clusters, CPUSS 105 may include additional or fewer clusters. Further, each cluster may include the same or a different number of CPU cores. The CPU cores 111, 112, 121, and 122 may be of the same type, or may be of different types (e.g., ARM design, non-ARM design, etc.). Further, the CPU cores of a given cluster (e.g., CPU cluster 110 or 120) may be of the same type, or may be of different types (e.g., in-cluster big.LITTLE design, cluster based big.LITTLE design, etc.). A big.LITTLE design may refer to a computing architecture that includes low power, slower processor cores (e.g., LITTLE) that provide battery-savings along with high power, faster processor cores (e.g., big) that provide better processing performance.

Further, the CPUSS 105 may include CPU resources, such as one or more caches. As shown, each cluster 110 and 120 includes a cache 115 and 125, respectively. In certain aspects, the CPU cores of the clusters 110 and 120 may share the cache 115 and 125, respectively, for memory storage. It should be noted that the CPUSS 105 may include additional or different CPU resources than those shown. For example, in some aspects, one or more CPU cores may have its own associated cache, one or more clusters may have its own associated cache (e.g., shared by CPU cores of the cluster), and/or the CPUSS 105 may include one or more caches shared by one or more clusters and/or CPU cores. The SoC 101 further may include additional CPUSS 103, and one or more digital signal processor sub-systems (DSPSS) such as DSPSS 107 and DSPSS 109. In certain aspects, each of CPUSS 103, DSPSS 107, and DSPSS 109 may have its own SRAM 152, 154, and 156, respectively, functioning as (e.g., in lieu of) a cache for reading and writing data.

The SoC 101 further includes a reset controller 130, an efuse component 140, static random-access memory (SRAM) 150, a read only memory (ROM) 160, a dynamic RAM (DRAM) controller 170, and a storage controller 180, and boot interface (I/F) controller 183, which are all shown as internal (e.g., on-chip) components of the SoC 101. The internal components of the SoC 101 are coupled together by a bus 185. Further, the DRAM controller 170 is coupled to a DRAM 190, which is external (e.g., off-chip) to the SoC 101, by a bus 192. A physical implementation of the DRAM 190 may be stacked with the SoC 101, may be configured as a package on package design, may be completely external (e.g., not on the same package as the SoC 101), etc. The storage controller 180 is coupled to a storage 195 (e.g., flash storage) external (e.g., off-chip) to the SoC 101 by a bus 197. The SRAM 150, DRAM 190, and storage 195 may provide additional storage capacity for the SoC 101.

In some aspects, the reset controller 130, during system boot, is configured to release a CPU core of the CPUSS 105 from reset. In some aspects, the CPU core released is then configured to execute code/data (e.g., boot code) from the ROM 160 to boot the SoC 101 (e.g., to run a high level operating system (OS)). The ROM 160 (e.g., boot ROM) is an integrated circuit that includes the code or codes (e.g., boot code) that are executed by the CPUSS 105 during an initial power-on or upon a watchdog reset condition (e.g., after a malfunction of circuit 100 that is detected by a timer on circuit 100 not being reset or "timing out"). In some aspects, the ROM is enabled in firmware. In some aspects, the CPUSS 105 boots securely from storage 195, by running executables, data images, etc. stored in storage 195 for booting the SoC 101. In some aspects, the CPUSS 105 boots securely from a transport layer instead of a storage (e.g., a flashless transport layer) as further discussed with respect to SoC 102. In certain aspects, CPUSS 105 boots securely by checking the integrity of software images used for boot prior to execution of the software images (e.g., using a cryptographic signature protocol, chain of trust, authentication tags, checksums, etc.).

Further, as discussed above, as part of the boot sequence, SoC 101 (e.g., the released CPU core of CPUSS 105) determines calibration parameters for operating a component coupled to the SoC. For example, in certain aspects, SoC 101 may determine calibration parameters for a component such as DRAM 190 as part of the boot sequence. For example, to determine calibration parameters, a set of data or a pattern (e.g., predetermined data or pattern) for calibrating the component may be input into a training algorithm for calibrating the component. The set of data/pattern may be referred to as a "training pattern". The training algorithm may be used to calibrate a set of items associated with the component, (e.g., DQ (Data) line between a memory and memory controller). The set of items to be calibrated may be referred to as "calibration items". The actual parameters determined from the training algorithm for the calibration items may be referred to as "calibration parameters".

As discussed, determining the calibration parameters may take a long time (e.g., where DRAM 190 is LPDDR4), which may not be feasible while also meeting boot time key performance indicator (KPI) metrics of a modem or Internet of Things (IoT) target response time. Accordingly, in certain aspects, storage 195 may store calibration parameters for DRAM 190 from a previous calibration and utilize the stored calibration parameters to operate DRAM 190. Thus, the boot time may be reduced for instances where previously stored calibration parameters for DRAM 190 are valid.

However, in certain aspects, it may be useful to determine new calibration parameters in different scenarios (e.g., new/improved calibration algorithms are created, initial calibration, calibration is invalid, etc.). In certain aspects, SoC 101 determines new calibration parameters to operate DRAM 190. For example, at the first-time boot of SoC 101 (e.g., at the factory), storage 195 may not store any calibration parameters for DRAM 190, or may store dummy calibration parameters (e.g., all 0 data) for DRAM 190. The SoC 101, upon determining that either no calibration parameters or invalid (e.g., dummy) calibration parameters are stored in storage 195, may determine new calibration parameters for DRAM 190. In certain aspects, SoC 101 may store the determined calibration parameters for DRAM 190 in storage 195.

Similarly, in certain aspects, even at subsequent boots of SoC 101, the SoC 101 may determine that storage 195 includes invalid calibration parameters for DRAM 190, and, therefore, determine new calibration parameters. For example, storage 195 may be swapped from one SoC to another SoC, and, therefore, any calibration parameters stored in the storage 195 may not be valid for the DRAM of the new SoC. In certain aspects, the SoC 101 may determine if calibration parameters stored in storage 195 are invalid based on a list of dependencies (e.g., one or more datasets, a unique identifier of the SoC, etc.) stored with the calibration parameters, as discussed further herein.

Similar to primary SoC 101, secondary SoC 102 includes a CPUSS 106. The CPUSS 106 includes a plurality of CPU cores 133 and 134. Though CPUSS 106 is shown with a particular number of CPU cores, it should be noted that there may be additional or fewer cores in CPUSS 106. Further, CPU cores 133 and 134 are part of a cluster 132. Again, though shown with a particular number of CPU clusters, CPUSS 106 may include additional or fewer clusters. Further, each cluster may include the same or a different number of CPU cores. The CPU cores 133 and 134 may be of the same type, or may be of different types (e.g., ARM design, non-ARM design, etc.). Further, the CPU cores of a given cluster (e.g., CPU cluster 132) may be of the same type, or may be of different types (e.g., in-cluster big.LITTLE design, cluster based big.LITTLE design, etc.).

Further, the CPUSS 106 may include CPU resources, such as one or more caches. As shown, cluster 132 includes a cache 135. The SoC 101 further may include additional CPUSS, and one or more DSPSS such as DSPSS 108. In certain aspects, each additional CPUSS and DSPSS may have its own SRAM (e.g., SRAM 155 of DSPSS 108).

The SoC 102 further includes a reset controller 131, an efuse component 141, static random-access memory (SRAM) 151, a read only memory (ROM) 161, a dynamic RAM (DRAM) controller 171, and boot interface (I/F) controller 184, which are all shown as internal (e.g., on-chip) components of the SoC 102. The internal components of the SoC 102 are coupled together by a bus 175. Further, the DRAM controller 171 is coupled to a DRAM 191 external (e.g., off-chip) to the SoC 102 by a bus 198. A physical implementation of the DRAM 191 may be stacked with the SoC 102, may be configured as a package on package design, may be completely external (e.g., not on the same package as the SoC 102), etc. Unlike SoC 101, SoC 102 is not directly connected to an external storage and also may not include a storage controller.

As discussed, boot of secondary SoC 102 may be controlled by primary SoC 101. In particular, SoC 101 may utilize boot I/F controller 183 and SoC 102 may utilize boot I/F controller 184 to communicate between SoC 101 and SoC 102 over a chip-to-chip interface. For example, boot I/F controller 183 of SoC 101 may control a chip-to-chip interface (e.g., transport layer) of SoC 101 such as PCIe interface 188 or USB interface 186 to communicate with a chip-to-chip interface such as PCIe interface 189 or USB interface 187 of SoC 102 controlled by boot I/F controller 184. Accordingly, SoC 101 and SoC 102 may communicate over a transport layer via boot I/F controllers 183 and 184.

In particular, as discussed, SoC 102 may not directly interface with an external storage so as to save on bill of material (BoM) costs. Therefore, SoC 102 may be configured to boot securely from a transport layer instead of a storage (e.g., a flashless transport layer). For example, SoC 101 may read from storage 195 executables, data images, etc. (also referred to as boot data) stored in storage 195 for booting the SoC 102. The SoC 101 may further power up the SoC 102 (e.g., control the SoC 102 to power up the SoC 102). SoC 101 may then push the boot data to SoC 102 or SoC 102 may pull (e.g., request) the boot data from SoC 101 over the transport layer (e.g., through a link between PCIe interface 188 and PCIe interface 189).

Upon receiving the boot data, the SoC 102 may determine to start a boot sequence. Accordingly, the SoC 101 may initiate the boot of SoC 102. In some aspects, the reset controller 131, during system boot, is configured to release a CPU core of the CPUSS 106 from reset. In some aspects, the released CPU core is then configured to execute code/data (e.g., boot code) from the ROM 161 to boot the SoC 102 (e.g., to run a high level operating system (OS)). The ROM 161 (e.g., boot ROM) is an integrated circuit that includes the code or codes (e.g., boot code) that are executed by the CPUSS 106 during an initial power-on or upon a watchdog reset condition. In some aspects, the ROM is enabled in firmware. In some aspects, the CPUSS 106 boots securely from the transport layer by utilizing the boot data received from SoC 101.

Further, as discussed above, as part of the boot sequence, SoC 102 (e.g., the released CPU core of CPUSS 106) determines calibration parameters for operating one or more components coupled to SoC 102, such as DRAM 191. In certain aspects, since SoC 102 does not have direct access to a storage like storage 195 with calibration parameters, the SoC 102 may calculate new calibration parameters on every boot for DRAM 191 (and store the parameters in SRAM 151 for use). Where calculating the calibration parameters takes a long time (e.g., where DRAM 191 is LPDDR4), this may not be feasible while also meeting boot time key performance indicator (KPI) metrics of a modem or Internet of Things (IoT) target response time. In certain other aspects, SoC 102 may calculate calibration parameters once for DRAM 191 and store the parameters in a one time programmable memory (e.g., fuses such as in efuse component 141). However, in such aspects, the calibration parameters are not reconfigurable and limits adaptations to the SoC 102 or DRAM 191.

Accordingly, certain aspects herein relate to systems and methods for calibration of a component coupled to a SoC over a transport layer as discuss further herein. For example, in certain aspects, a secondary SoC may initially determine calibration parameters for an external component coupled to a secondary SoC during a boot and transmit the calibration parameters to the primary SoC for storage. Upon a subsequent boot, the secondary SoC may receive the previously determined calibration parameters from the primary SoC.

In particular, in certain aspects, a primary SoC is configured to store, in a storage accessible by the primary SoC, calibration parameters for a component connected to a secondary SoC. The primary SoC is further configured to push the calibration parameters to the secondary SoC, which the secondary SoC may utilize to operate the component, without having to spend time to determine the calibration parameters itself. Thus, the boot time of the secondary SoC may be reduced for instances where the received calibration parameters are valid.

The secondary SoC may further be configured to determine whether the calibration parameters received from the primary SoC are valid, and if they are not, then determine new calibration parameters and utilize the new calibration parameters to operate the component. The secondary SoC may further be configured to push the new calibration parameters to the primary SoC for storage in the storage accessible by the primary SoC for use in a subsequent boot to avoid having to re-determine the new calibration parameters during the subsequent boot. In certain aspects, by having the secondary SoC determine the validity of the calibration parameters received from the primary SoC, the secondary SoC can advantageously detect memory exploits of the stored calibration parameters, force recalibration, or handle recalibration either in a factory unprovisioned scenario or for a reprovisioning (e.g., due to an over-the-air (OTA) update).

In certain aspects, a SoC (e.g., SoC 101 or SoC 102) is configured to determine if calibration parameters for a component are valid based on a list of dependencies associated with the calibration parameters. Though certain aspects of determining whether calibration parameters for a component are valid are discussed with respect to SoC 102 and DRAM 191, it should be noted that similar techniques may be utilized by SoC 101 for DRAM 190 or other components coupled to either SoC 101 or SoC 102.

In certain aspects, when SoC 102 performs a calibration of DRAM 191 and determines calibration parameters, the SoC 102 may also compute a checksum (e.g., cyclic redundancy check (CRC)) of data (e.g., list of dependencies) pertaining to the calibration of the DRAM 191. For example, the SoC 102 may utilize one or more datasets available to the SoC 102 (e.g., in storage 195 and received from the SoC 101), such as a frequency matrix, voltage configuration, training algorithm, DDR device parameters, etc., to calibrate the DRAM 191. The SoC 102 may also have a unique (or partially unique) identifier associated with the SoC 102. The SoC 102 may compute a checksum for determined calibration parameters based on at least one of: the one or more datasets, the unique identifier associated with the SoC 102, and the determined calibration parameters. The SoC 102 may then store the checksum with the determined calibration parameters (e.g., in storage 195).

Accordingly, when the SoC 102 obtains previously determined calibration parameters (e.g., from storage 195) the SoC 102 also receives the previously computed checksum stored with the determined calibration parameters. The SoC 102 further computes a new checksum based on the at least one of the one or more datasets available to the SoC 102 for determining the calibration parameters, the unique identifier of the SoC 102, and the retrieved previously determined calibration parameters. The SoC 102 then determines if the new checksum matches the previously computed checksum. If the new checksum matches the previously computed checksum, then the SoC 102 utilizes the previously determined calibration parameters. If the new checksum does not match the previously computed checksum, then the SoC 102 determines that the calibration parameters are invalid and determines new calibration parameters. Accordingly, if the calibration parameters are tampered with, one or more datasets change, or the calibration parameters are for a different SoC with a different identifier, then those calibration parameters are not used.

In certain aspects, where the unique identifier of the SoC 102 is utilized to compute the checksum, if the calibration parameters were calculated for a different SoC (e.g., reuse of storage 195 of a different SoC), then the SoC 102 would determine that the calibration parameters are invalid. Therefore, accidental use of calibration parameters for a different SoC may be avoided. In certain aspects, where the training algorithm of the SoC 102 is utilized to compute the checksum, if the training algorithm for the DRAM 191 is updated (e.g., via an OTA update), then the SoC 102 would determine that the calibration parameters are invalid. Accordingly, improved training algorithms can be utilized to update calibration parameters. In certain aspects, where the determined calibration parameters are utilized to compute the checksum, where the calibration parameters are changed in storage 195 (e.g., deliberately or due to an error), the SoC 102 would determine that the calibration parameters are invalid. Accordingly, using erroneous calibration parameters can be prevented. Thus, the checksum process for determining validity of calibration parameters can provide several advantages.

However, in certain aspects, a checksum calculation may not fully protect the calibration parameters from being tampered with. For example, the method of calculating a checksum used by SoC 102 may be available to devices/SoCs other than SoC 102. Accordingly, another device, such as the SoC 101, may be capable of changing/tampering with the stored calibration parameters or datasets, and calculating a new checksum and storing the new checksum with the changed information. Then, when SoC 102 receives the changed data and the new checksum, SoC 102 may determine that the calibration parameters are still valid, when, in fact, they have been tampered with.

Accordingly, certain aspects relate to, in addition or alternative to calculating a checksum for calibration parameters, calculating an authentication tag for the calibration parameters. In particular, instead of using the identifier of SoC 102 (which may be available openly) to calculate the authentication tag, the SoC 102 may first generate a key utilizing the identifier. For example, the SoC 102 may optionally include a key generator 193, which may be logic implemented by CPUSS 106 or another physical component of SoC 102 configured to implement a key generation algorithm, to generate the key based on the identifier. The key generation algorithm may be implemented by the SoC 102 itself and not be available to other devices or SoCs. Accordingly, other devices may not be able to generate the same key as SoC 102 even if they have access to the identifier of SoC 102. Further, the SoC 102 may optionally include an authentication logic component 194, which may be logic implemented by CPUSS 106 or another physical component of SoC 102 configured to implement an authentication logic (e.g., an authentication algorithm, a cryptographic message authentication code (MAC), or an encryption or cryptographic algorithm, etc.) that is not available to other devices or SoCs, to generate an encrypted authentication tag. The SoC 102 may utilize the authentication logic component 194 to calculate the authentication tag based at least on one of the one or more datasets available to the SoC 102 for determining the calibration parameters, the key generated by the SoC 102, a checksum calculated by the SoC 102, and the calibration parameters. In certain aspects, all of this information is used to calculate the authentication tag. In some aspects, a checksum is not calculated and not used in the calculation of the authentication tag. In certain aspects, the authentication tag is then stored with the calculated calibration parameters.

Figure 2:
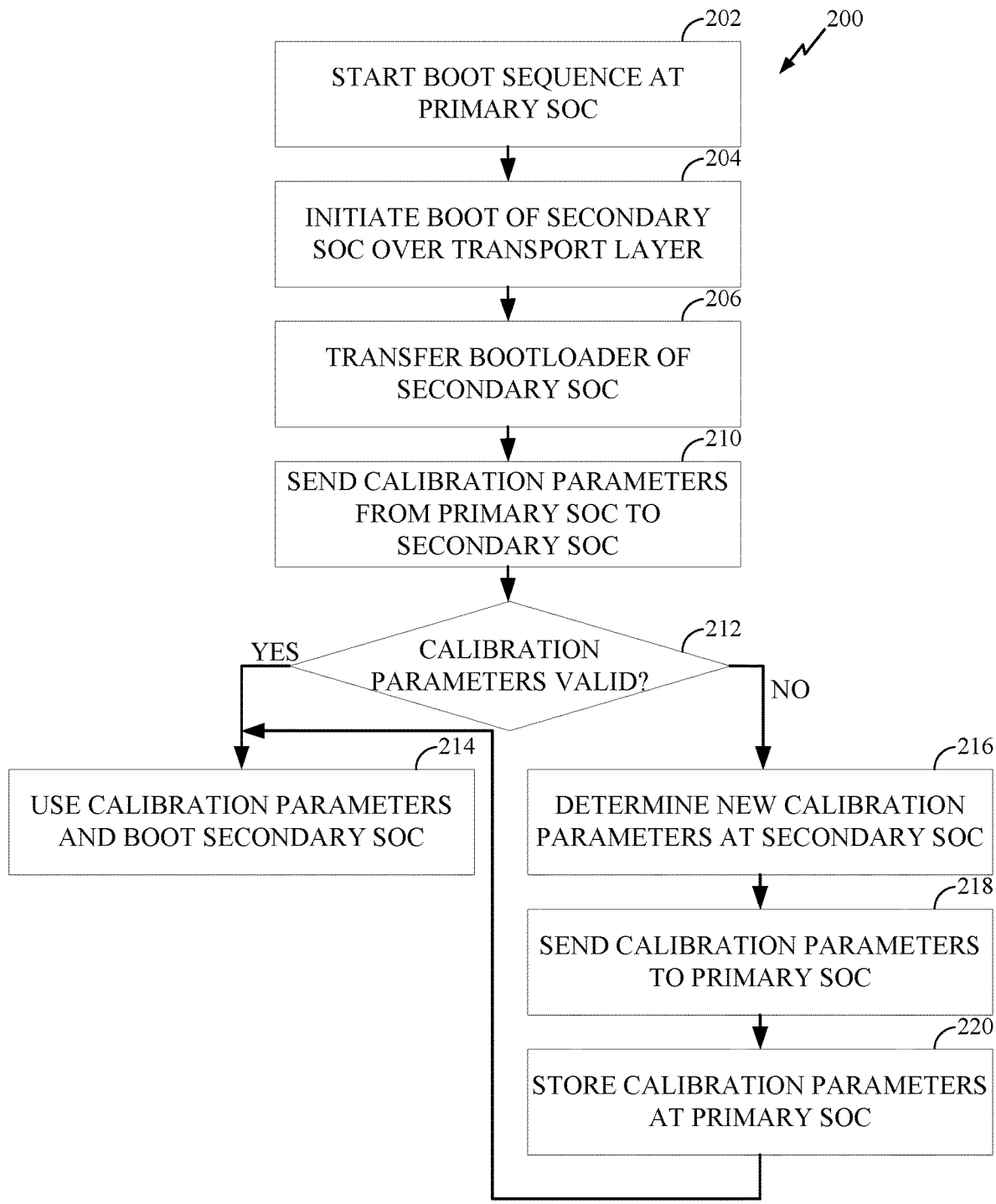
FIG. 2 is a flow chart that illustrates example operations for booting a secondary SoC using a primary SoC, in accordance with certain aspects of the present disclosure.

FIG. 2 is a flow chart that illustrates example operations 200 for booting a secondary SoC using a primary SoC, in accordance with certain aspects of the present disclosure. For example, the operations of FIG. 2 may be performed by the circuit 100, or another suitable circuit.

At step 202, a primary SoC of a circuit starts a boot sequence. For example, the SoC 101 initiates a boot sequence, and performs a boot such as from storage 195 as discussed herein. Further, at step 204, the primary SoC initiates boot of a secondary SoC over a transport layer. For example, the SoC 101 initiates a boot sequence of the SoC 102 over the transport layer and brings the SoC 102 out of reset. The SoC 102 further may securely boot from ROM 161 and wait for the bootloader with DDR driver to be received (e.g., downloaded) over the transport layer from the SoC 101.

At step 206, the primary SoC transfers the bootloader of the secondary SoC to the secondary SoC. For example, the SoC 101 transfers the bootloader of the SoC 102 over the transport layer by transferring executables, data images, etc. (also referred to as boot data) of the SoC 102 stored in storage 195 over the transport layer. In certain aspects, the primary SoC may also transfer a training pattern for calibrating the memory of the secondary SoC to the secondary SoC along with the bootloader. At step 210, the primary SoC sends calibration parameters to the secondary SoC. For example, the SoC 101 retrieves calibration parameters for DRAM 191 and a corresponding checksum and/or authentication tag from storage 195 and transfers the calibration parameters and checksum and/or authentication tag to SoC 102 over the transport layer. The SoC 101 may push the calibration parameters and checksum and/or authentication tag to SoC 102, or SoC 102 may pull the calibration parameters and checksum and/or authentication tag from SoC 101. The SoC 102 may store the calibration parameters and checksum and/or authentication tag in SRAM 151. In certain aspects, such as a first boot of circuit 100, there may not be calibration parameters and a checksum and/or authentication tag stored in storage 195, and the SoC 101 may generate dummy calibration parameters and a checksum and/or authentication tag (e.g., all 0 data) and send to the SoC 102. In certain aspects, the dummy data may initially be provisioned in storage 195. In certain aspects, such as where it is not performed at step 206, the primary SoC may also transfer a training pattern for calibrating the memory of the secondary SoC to the secondary SoC along with the calibration parameters and a checksum and/or authentication tag.

At step 212, the secondary SoC determines if the received calibration parameters are valid. For example, the SoC 102 calculates a checksum and/or authentication tag for the received calibration parameters and determines if the calculated checksum and/or authentication tag matches the received checksum and/or authentication tag (e.g., calibration parameters are valid) or if the checksums and/or authentication tags do not match (e.g., calibration parameters are invalid). If at step 212, the secondary SoC determines the calibration parameters are valid, then at step 214, the secondary SoC uses the calibration parameters for operating the external memory and continues the boot process. For example, the SoC 102 uses the calibration parameters for DRAM 191 and indicates to the SoC 101 to send all subsequent boot data.

If at step 212, the secondary SoC determines the calibration parameters are not valid, then at step 216, the secondary SoC determines new calibration parameters for the external memory and continues the boot process. For example, the SoC 102 calculates new calibration parameters using a training pattern by performing a calibration procedure for DRAM 191. In certain aspects, such as where it is not performed at steps 206 or 210, the secondary SoC may also request and the primary SoC may transfer a training pattern for calibrating the memory of the secondary SoC to the secondary SoC to use to determine the new calibration parameters. The SoC 102 may further calculate a checksum and/or authentication tag for the new calibration parameters. At step 218, the secondary SoC sends the determined calibration parameters to the primary SoC. For example, the SoC 102 sends the calibration parameters and checksum and/or authentication tag to the SoC 101 over the transport layer. At step 220, the primary SoC stores the received calibration parameters. For example, the SoC 101 stores the calibration parameters and checksum and/or authentication tag in storage 195. Continuing at step 214, the primary SoC may continue to boot the secondary SoC, or may reset and restart the boot of the secondary SoC. For example, the SoC 101 may continue boot of the SoC 102 at step 214, or return to step 204.

Figure 3:
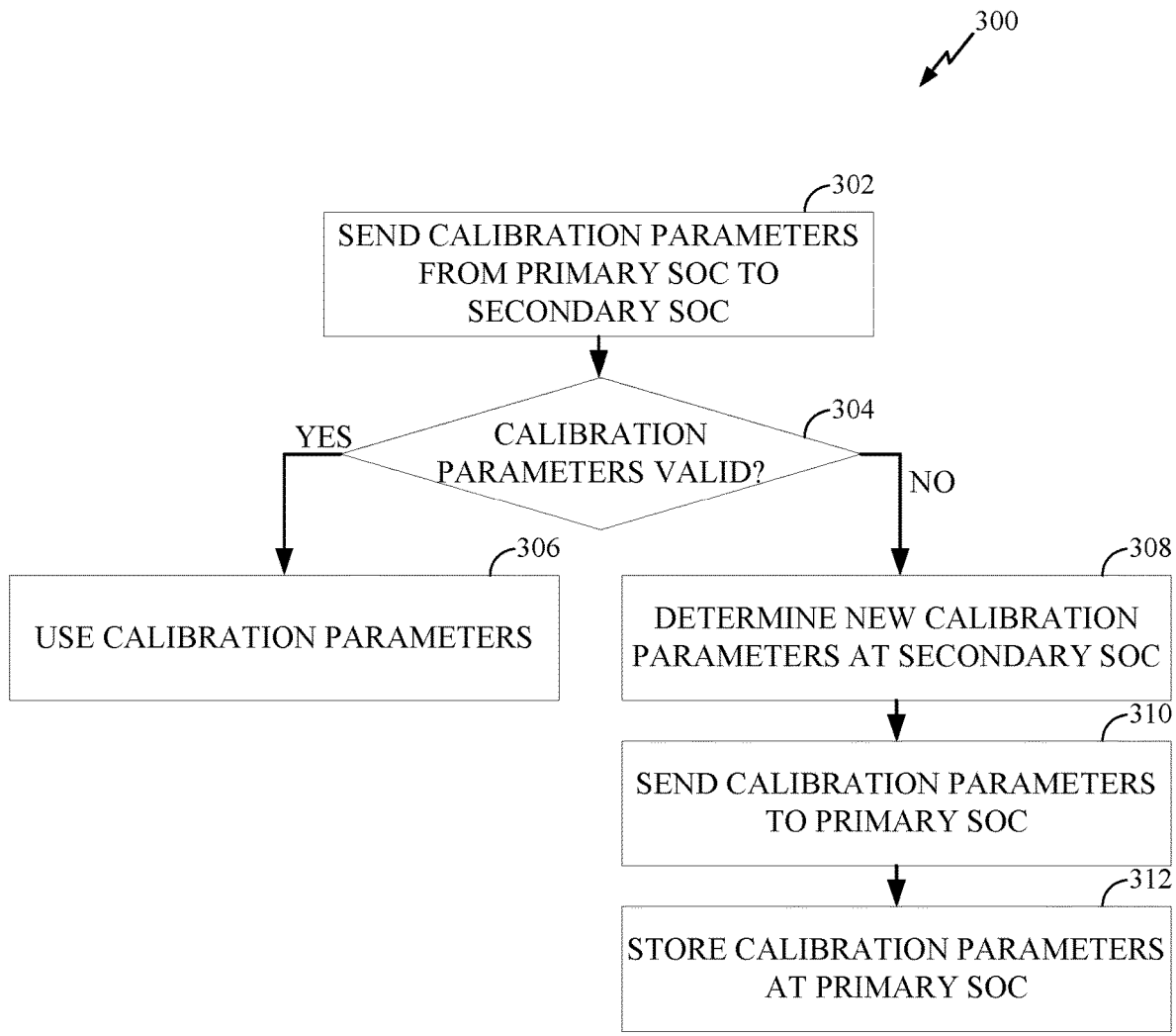
FIG. 3 is a flow chart that illustrates example operations for determining calibration parameters of a memory, in accordance with certain aspects of the present disclosure.

FIG. 3 is a flow chart that illustrates example operations 300 for determining calibration parameters of a memory, in accordance with certain aspects of the present disclosure. For example, the operations of FIG. 3 may be performed by the circuit 100, or another suitable circuit. In certain aspects, certain of operations 300 may correspond to steps 210-220 of operations 200.

At step 302, the primary SoC sends to the secondary SoC calibration data for an external memory coupled to the secondary SoC. For example, the SoC 101 sends (e.g., over a transport layer) calibration data (e.g., stored in storage 195) to SoC 102 for DRAM 191. At step 304, the secondary SoC determines if the calibration data is valid. For example, the SoC 102 calculates a checksum and/or authentication tag for the calibration data and compares the checksum and/or authentication tag to a checksum and/or authentication tag sent by the SoC 101 with the calibration data. If at step 304, the secondary SoC determines that the calibration data is valid, then at step 306, the secondary SoC uses the calibration data for operating the external memory. For example, the SoC 102 uses the calibration data for DRAM 191. If at step 304, the secondary SoC determines the calibration data is not valid, then at step 308, the secondary SoC determines new calibration data for the external memory. For example, the SoC 102 calculates new calibration data by performing a calibration procedure for DRAM 191. The SoC 102 may further calculate a checksum and/or authentication tag for the new calibration data. At step 310, the secondary SoC sends the determined calibration data to the primary SoC. For example, the SoC 102 sends the calibration data and checksum and/or authentication tag to the SoC 101 over the transport layer. At step 312, the primary SoC stores the received calibration data. For example, the SoC 101 stores the calibration data and checksum and/or authentication tag in storage 195.

Figure 4:
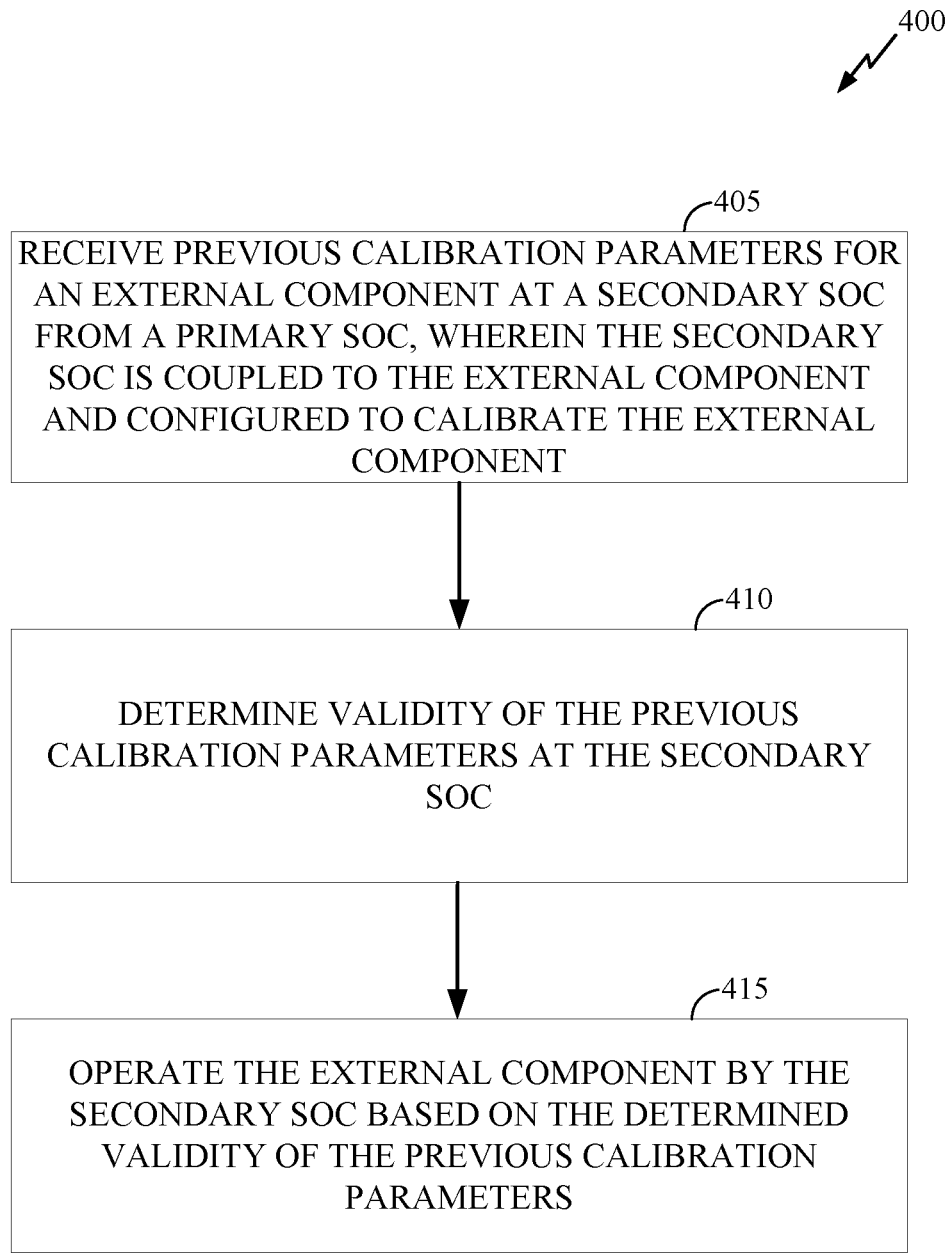
FIG. 4 is a flow chart that illustrates example operations for determining calibration parameters for a component coupled to a SoC, in accordance with certain aspects of the present disclosure.

FIG. 4 is a flow chart that illustrates example operations 400 for determining calibration parameters for a component coupled to a SoC, in accordance with certain aspects of the present disclosure. For example, the operations of FIG. 4 may be performed by the circuit 100, or another suitable circuit.

At step 405, a secondary SoC receives previous calibration parameters for an external component from a primary SoC, wherein the secondary SoC is coupled to the external component and configured to calibrate the external component. At step 410, the secondary SoC determines the validity of the previous calibration parameters. At step 415, the secondary SoC operates the external component based on the determined validity of the previous calibration parameters.

In some configurations, the term(s) 'communicate,' communicating; and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission', and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disc storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc. Combinations of the above should also be included within the scope of computer-readable media.

What is claimed is:

1. A method of calibrating a component, the method comprising:
   receiving previous calibration parameters for an external component at a secondary SoC from a primary SoC, wherein the secondary SoC is coupled to the external component and configured to calibrate the external component;
   determining validity of the previous calibration parameters by the secondary SoC; and
   operating the external component by the secondary SoC based on the determined validity of the previous calibration parameters.

2. The method of claim 1, further comprising:
   controlling boot of the secondary SoC by the primary SoC;
   determining new calibration parameters for the external component by the secondary SoC based on determining the previous calibration parameters are invalid;
   transmitting the new calibration parameters from the secondary SoC to the primary SoC; and
   operating the external component using the new calibration parameters.

3. The method of claim 2, wherein the previous calibration parameters are determined based on previous one or more datasets for determining calibration parameters, and further comprising receiving one or more new datasets for determining calibration parameters as an update to the previous one or more datasets for determining calibration parameters, wherein the new calibration parameters are determined based on the one or more new datasets for determining calibration parameters.

4. The method of claim 3, wherein the one or more new datasets comprise one or more of a frequency matrix, a voltage configuration, a training algorithm, or double data rate dynamic random access memory parameters.

5. The method of claim 2, wherein the previous calibration parameters comprise dummy data.

6. The method of claim 2, further comprising storing the new calibration parameters in a storage of the primary SoC.

7. The method of claim 6, wherein the secondary SoC does not directly interface with any storage that is configured to store the new calibration parameters or the previous calibration parameters.

8. The method of claim 1, further comprising:
receiving a previous checksum corresponding to the previous calibration parameters at the secondary SoC from the primary SoC; and
calculating a new checksum at the secondary SoC based on previous calibration parameters, at least one of one or more datasets for determining calibration parameters by the secondary SoC, and an identifier of the secondary SoC, wherein determining the validity of the previous calibration parameters comprises comparing the previous checksum to the new checksum.

9. The method of claim 1, further comprising:
receiving a previous authentication tag corresponding to the previous calibration parameters at the secondary SoC from the primary SoC; and
calculating, based on an authentication algorithm, a new authentication tag at the secondary SoC based on previous calibration parameters, at least one of one or more datasets for determining calibration parameters by the secondary SoC, and a key based on an identifier of the secondary SoC, wherein the key is calculated by the secondary SoC and unavailable to the primary SoC, wherein the authentication algorithm is unavailable to the primary SoC, and wherein determining the validity of the previous calibration parameters comprises comparing the previous authentication tag to the new authentication tag.

10. The method of claim 1, wherein the external component is one of stacked with the secondary SoC, configured as a package on package design with the secondary SoC, or on a different package than the secondary SoC.

11. The method of claim 1, wherein receiving the previous calibration parameters is performed over a transport layer.

12. The method of claim 1, further comprising operating the external component using the previous calibration parameters based on determining the previous calibration parameters are valid.

13. The method of claim 1, wherein the external component comprises an external memory.

14. A circuit comprising:
a primary SoC comprising:
a first bus;
a first processor coupled to the first bus;
a storage controller coupled to the first bus; and
a first chip to chip interface coupled to the first bus;
a secondary SoC comprising:
a second bus;
a second processor coupled to the second bus;
a component interface coupled to the second bus, wherein the component interface is configured to interface with an external component; and
a second chip to chip interface coupled to the second bus, wherein the second chip to chip interface is configured to interface with the first chip to chip interface to provide communication between the primary SoC and the secondary SoC;
wherein the second processor is configured to:
receive previous calibration parameters for the external component from the first processor, wherein the first processor is configured to retrieve the previous calibration parameters from a storage coupled to the storage controller;
determine validity of the previous calibration parameters; and
operate the external component based on the determined validity of the previous calibration parameters.

15. The circuit of claim 14, wherein the primary SoC is configured to control boot of the secondary SoC, wherein the secondary SoC is configured to determine new calibration parameters for the external component based on determining the previous calibration parameters are invalid, wherein the secondary SoC is configured to transmit the new calibration parameters to the primary SoC, and wherein the secondary SoC is configured to operate the external component using the new calibration parameters.

16. The circuit of claim 15, wherein the previous calibration parameters are determined based on previous one or more datasets for determining calibration parameters, and wherein the secondary SoC is further configured to receive one or more new datasets for determining calibration parameters as an update to the previous one or more datasets for determining calibration parameters, wherein the new calibration parameters are determined based on the one or more new datasets for determining calibration parameters.

17. The circuit of claim 16, wherein the one or more new datasets comprise one or more of a frequency matrix, a voltage configuration, a training algorithm, or double data rate dynamic random access memory parameters.

18. The circuit of claim 15, wherein the previous calibration parameters comprise dummy data.

19. The circuit of claim 15, wherein the primary SoC is further configured to store the new calibration parameters in a storage of the primary SoC.

20. The circuit of claim 19, wherein the secondary SoC does not directly interface with any storage that is configured to store the new calibration parameters or the previous calibration parameters.

21. The circuit of claim 14, wherein the secondary SoC is further configured to:
receive a previous checksum corresponding to the previous calibration parameters from the primary SoC; and
calculate a new checksum based on previous calibration parameters, at least one of one or more datasets for determining calibration parameters by the secondary SoC, and an identifier of the secondary SoC, wherein determining the validity of the previous calibration parameters comprises comparing the previous checksum to the new checksum.

22. The circuit of claim 14, wherein the secondary SoC is further configured to:
receive a previous authentication tag corresponding to the previous calibration parameters from the primary SoC; and
calculate, based on an authentication algorithm, a new authentication tag based on previous calibration parameters, at least one of one or more datasets for determining calibration parameters by the secondary SoC, and a key based on an identifier of the secondary SoC, wherein the key is calculated by the secondary SoC and unavailable to the primary SoC, wherein the authentication algorithm is unavailable to the primary SoC, and wherein determining the validity of the previous calibration parameters comprises comparing the previous authentication tag to the new authentication tag.

23. The circuit of claim 14, wherein the external component is one of stacked with the secondary SoC, configured as a package on package design with the secondary SoC, or on a different package than the secondary SoC.

24. The circuit of claim 14, wherein receiving the previous calibration parameters is performed over a transport layer.

25. The circuit of claim 14, wherein the secondary SoC is configured to operate the external component using the previous calibration parameters based on determining the previous calibration parameters are valid.

26. The circuit of claim 14, wherein the external component comprises an external memory.

27. A circuit comprising:
  means for receiving previous calibration parameters for an external component at a secondary SoC from a primary SoC, wherein the secondary SoC is coupled to the external component and configured to calibrate the external component;
  means for determining validity of the previous calibration parameters by the secondary SoC; and
  means for operating the external component by the secondary SoC based on the determined validity of the previous calibration parameters.

28. The circuit of claim 27, further comprising:
  means for controlling boot of the secondary SoC by the primary SoC;
  means for determining new calibration parameters for the external component by the secondary SoC based on determining the previous calibration parameters are invalid;
  means for transmitting the new calibration parameters from the secondary SoC to the primary SoC; and
  means for operating the external component using the new calibration parameters.

29. A non-transitory computer readable medium having instructions stored thereon for causing a circuit to perform a method of calibrating a component, the method comprising:
  receiving previous calibration parameters for an external component at a secondary SoC from a primary SoC, wherein the secondary SoC is coupled to the external component and configured to calibrate the external component;
  determining validity of the previous calibration parameters by the secondary SoC; and
  operating the external component by the secondary SoC based on the determined validity of the previous calibration parameters.

30. The non-transitory computer readable medium of claim 29, wherein the method further comprises:
  controlling boot of the secondary SoC by the primary SoC;
  determining new calibration parameters for the external component by the secondary SoC based on determining the previous calibration parameters are invalid;
  transmitting the new calibration parameters from the secondary SoC to the primary SoC; and
  operating the external component using the new calibration parameters.

* * * * *